(12) United States Patent
Miao et al.

(10) Patent No.: US 11,558,892 B2
(45) Date of Patent: Jan. 17, 2023

(54) METHOD AND APPARATUS FOR TRANSMITTING CONFIGURATION INFORMATION OF PHYSICAL DOWNLINK CONTROL CHANNEL

(71) Applicant: DATANG MOBILE COMMUNICATIONS EQUIPMENT CO., LTD., Beijing (CN)

(72) Inventors: Deshan Miao, Beijing (CN); Lei Wang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 14 days.

(21) Appl. No.: 17/257,435

(22) PCT Filed: Jun. 3, 2019

(86) PCT No.: PCT/CN2019/089875
§ 371 (c)(1),
(2) Date: Dec. 31, 2020

(87) PCT Pub. No.: WO2020/007151
PCT Pub. Date: Jan. 9, 2020

(65) Prior Publication Data
US 2021/0227572 A1    Jul. 22, 2021

(30) Foreign Application Priority Data
Jul. 3, 2018  (CN) .......................... 201810719558.3

(51) Int. Cl.
*H04W 72/04* (2009.01)
*H04W 72/12* (2009.01)
(Continued)

(52) U.S. Cl.
CPC ....... *H04W 72/1289* (2013.01); *H04L 1/1819* (2013.01); *H04L 1/1896* (2013.01); *H04W 72/1226* (2013.01); *H04W 80/02* (2013.01)

(58) Field of Classification Search
CPC ......... H04W 72/1289; H04W 72/1226; H04W 72/042; H04W 72/0406; H04W 80/02;
(Continued)

(56) References Cited

U.S. PATENT DOCUMENTS

2012/0275405 A1  11/2012  Kim et al.
2013/0039284 A1   2/2013  Marinier et al.
(Continued)

FOREIGN PATENT DOCUMENTS

CN    102215586 A    10/2011
CN    103716144 A     4/2014
(Continued)

OTHER PUBLICATIONS

Guangdong Oppo Mobile Telecom: "DL control channel design for URLLC", 3GPP Draft; R1-1713260, vol. RAN WGI Meeting #90, Prague, Czech Republic, Aug. 21-25, 2017, 4 pages.
International Search Report for International Application No. PCT/CN2019/089875 dated Sep. 3, 2019.

*Primary Examiner* — Mahbubul Bar Chowdhury
(74) *Attorney, Agent, or Firm* — Meunier Carlin & Curfman LLC

(57) ABSTRACT

Disclosed are a method and apparatus for transmitting configuration information of a physical downlink control channel. The method comprises: acquiring state information of a terminal device, and generating dynamic signaling according to the state information of the terminal device, wherein the state information of the terminal device comprises service state information of the terminal device or channel state information of the terminal device; and sending the dynamic signaling to the terminal device, the
(Continued)

dynamic signaling being used to indicate first configuration information of a search space, wherein the first configuration information is used to indicate that the terminal device monitors a physical downlink control channel (PDCCH). The technical problem of high power consumption of a terminal device in the prior art is solved.

11 Claims, 3 Drawing Sheets

(51) Int. Cl.
  *H04L 1/18* (2006.01)
  *H04W 80/02* (2009.01)
(58) Field of Classification Search
  CPC ... H04L 1/1819; H04L 1/1896; H04L 5/0051; H04L 5/0057; H04L 5/0094; H04L 5/0053; H04L 5/001; H04L 5/0048; H04L 5/0007
  See application file for complete search history.

(56) References Cited

U.S. PATENT DOCUMENTS

| | | | |
|---|---|---|---|
| 2019/0357198 A1* | 11/2019 | Xiong | H04W 72/0453 |
| 2020/0022119 A1* | 1/2020 | Wang | H04W 72/042 |
| 2020/0059911 A1* | 2/2020 | Tang | H04L 5/0053 |
| 2020/0367253 A1* | 11/2020 | Kim | H04W 72/042 |
| 2021/0219313 A1* | 7/2021 | Matsumura | H04L 5/0053 |

FOREIGN PATENT DOCUMENTS

| | | |
|---|---|---|
| CN | 105471560 A | 4/2016 |
| CN | 105472570 A | 4/2016 |
| CN | 102893684 B | 9/2016 |
| WO | 2012109542 A1 | 8/2012 |
| WO | 2015115579 A1 | 8/2015 |
| WO | 2017052199 A1 | 3/2017 |
| WO | 2018016907 A1 | 1/2018 |
| WO | 2018031327 A1 | 2/2018 |

* cited by examiner

METHOD AND APPARATUS FOR TRANSMITTING CONFIGURATION INFORMATION OF PHYSICAL DOWNLINK CONTROL CHANNEL

The present disclosure is a National Stage of International Application No. PCT/CN2019/089875, filed Jun. 3, 2019, which claims priority to the Chinese Patent Application No. 201810719558.3, filed to the China Patent Office on Jul. 3, 2018, the entire contents of which are incorporated herein by reference.

FIELD

The present disclosure relates to the field of communication technology, in particular to a method and apparatus for transmitting configuration information of a physical downlink control channel.

BACKGROUND

In a 5th generation new radio (5G NR) access technology system, the configuration of a physical downlink control channel (PDCCH) is related to a control-resource set (CORESET) and a search space, the search space refers to the time and period needed for monitoring in the condition that a terminal device monitors the PDCCH, the position in the CORESET and a candidate set of granularity of the control domain allocation resource element (control channel element, CCE), and each PDCCH is usually mapped to one or more CCEs. The set of multiple CCEs is called aggregation, and the order of magnitude is an aggregation level (AL). If the aggregation level is larger, the PDCCH will be mapped to more CCEs, thus the transmission performance of the PDCCH will be better.

At present, in order to monitor the PDCCH sent by a base station in real time, the terminal device monitors the PDCCH based on the configuration of radio resource control (RRC) signaling. Based on the configuration of the RRC signaling, each terminal device can be configured with multiple sets of control resources, each control resource set is configured with multiple search spaces, and each search space corresponds to a configuration of multiple levels of aggregation. Since the PDCCH is sent based on requirements, the terminal device needs to monitor the PDCCHs in PDCCH candidate sets corresponding to the configuration of multiple control resource sets, multiple search spaces and multiple aggregation levels, thus resulting in multiple PDCCH blind detecting by the terminal device in one time slot, and further increasing the power consumption of the terminal device.

SUMMARY

The present disclosure provides a method and apparatus for transmitting configuration information of a physical downlink control channel, which are used for solving the technical problem of high power consumption of a terminal device in the prior art.

In the first aspect, the present disclosure provides a method for configuring a physical downlink control channel, including:
acquiring state information of a terminal device by a base station and generating a dynamic signaling based on the state information of the terminal device, wherein the state information of the terminal device includes service state information of the terminal device or channel state information of the terminal device; and sending the dynamic signaling to the terminal device, wherein the dynamic signaling is used to indicate first configuration information of a search space, and the first configuration information is used to indicate that the terminal device monitors a PDCCH.

In the solution provided by the embodiments of the disclosure, in the condition that the state information of the terminal device changes, the base station generates the dynamic signaling based on the state information of the terminal device to indicate first configuration information of the search space needed to be monitored by the terminal device in the current state, the first configuration information being a subset of configuration information indicated by an RRC signaling. Therefore, the first configuration information is used to indicate the terminal device to monitor the PDCCH, so that the number of times the PDCCH blind detecting is performed by the terminal device is reduced, the power consumption of the terminal device is reduced, and the experience effect of users is further improved.

Alternatively, the first configuration information includes at least one piece of the following information:
information of a configuration set of an aggregation level of the PDCCH in the search space needed to be monitored by the terminal device;
information of a position of a candidate resource contained in each of aggregation levels of the PDCCH in the search space needed to be monitored by the terminal device;
information of a search space set of the PDCCH needed to be monitored by the terminal device; or
indication information for channel estimation based on a broadband demodulation reference signal in the condition that the terminal device demodulates the monitored PDCCH.

Alternatively, before sending the dynamic signaling, the method further includes:
sending an RRC signaling used to indicate second configuration information of a search space, wherein the first configuration information of the search space indicated by the dynamic signaling is a subset of the second configuration information.

Alternatively, the dynamic signaling includes at least one of: a media access control (MAC) layer signaling, a group downlink control channel signaling or a user-specific downlink control channel signaling.

Alternatively, in the condition that the dynamic signaling is the group downlink control channel signaling or the user-specific downlink control channel signaling, sending the dynamic signaling to the terminal device includes:
sending the dynamic signaling to the terminal device in a preset time window.

In the second aspect, the present disclosure provides a method for receiving configuration information of a physical downlink control channel, including: receiving a dynamic signaling sent by a base station via a terminal device, and monitoring a PDCCH based on first configuration information of a search space indicated by the dynamic signaling; wherein the dynamic signaling is generated based on acquired channel state information or service state information of the terminal device.

In the solution provided by the embodiments of the disclosure, in the condition that the state information of the terminal device changes, the base station generates the dynamic signaling based on the state information of the terminal device to indicate first configuration information of the search space needed to be monitored by the terminal device in the current state, the first configuration information being a subset of the configuration information indicated by the RRC signaling. Therefore, the first configuration information is used to indicate the terminal device to monitor the PDCCH, so that the number of times the PDCCH blind detecting is performed by the terminal device is reduced, the power consumption of the terminal device is reduced, and the experience effect of users is further improved.

Alternatively, the first configuration information includes at least one piece of the following indication information:
  information of a configuration set of an aggregation level of the PDCCH in the search space needed to be monitored by the terminal device;
  information of a position of a candidate resource contained in each of aggregation levels of the PDCCH in the search space needed to be monitored by the terminal device:
  information of a search space set of the PDCCH needed to be monitored by the terminal device; or
  indication information for channel estimation based on a broadband demodulation reference signal in the condition that the terminal device demodulates the monitored PDCCH.

Alternatively, before receiving the dynamic signaling, the method also includes: receiving an RRC signaling used to indicate second configuration information of a search space, wherein the first configuration information of the search space indicated by the dynamic signaling is a subset of the second configuration information; and monitoring the PDCCH based on the second configuration information received.

Alternatively, the dynamic signaling includes at least one of: a MAC layer signaling, a group downlink control channel signaling or a user-specific downlink control channel signaling.

Alternatively, in the condition that the dynamic signaling received is the MAC layer signaling, the method further includes: feeding back hybrid automatic repeat request-acknowledgement (HARQ-ACK) after receiving a physical downlink shared channel (PDSCH) bearing the MAC layer signaling, and monitoring the PDCCH based on the first configuration information at an Nth time slot after feedback of the HARQ-ACK, wherein N is an integer greater than or equal to 1.

In the solution provided by the embodiments of the present disclosure, the terminal device monitors the PDCCH based on the first configuration information at the Nth time slot after feedback of the HARQ-ACK, therefore, both the terminal device and the base station determine the effective time of the dynamic signaling based on the HARQ-ACK, thus avoiding the inconsistency of the effective time of the dynamic signaling determined by the base station and the terminal device, and further guaranteeing the timeliness of the dynamic signaling.

Alternatively, in the condition that the dynamic signaling is a group physical layer downlink control channel signaling or a user-specific physical layer downlink control channel signaling, the method further includes: detecting, at a preset time point or within a preset time period, whether the dynamic signaling is received; if the dynamic signaling is received, monitoring the PDCCH based on the first configuration information, otherwise, monitoring the PDCCH based on the second configuration information.

In the solution provided by the embodiment of the present disclosure, the terminal device detects, at a preset time point or within a preset time period, whether the dynamic signaling is received to determine whether to monitor the PDCCH based on the first configuration information or the second configuration information, so as to avoid inconsistency between the configuration of the search space of the terminal device determined by the base station and the configuration of the search space determined by the terminal device due to the loss of the PDCCH.

In the solution provided by the embodiments of the disclosure, in the condition that the state information of the terminal device changes, the base station generates the dynamic signaling based on the state information of the terminal device to indicate first configuration information of the search space needed to be monitored by the terminal device in the current state, the first configuration information being a subset of the configuration information indicated by the RRC signaling. Therefore, the first configuration information is used to indicate the terminal device to monitor the PDCCH, so that the number of times the PDCCH blind detecting is performed by the terminal device is reduced, the power consumption of the terminal device is reduced, and the experience effect of users is further improved.

Alternatively, in the condition that the dynamic signaling received is the MAC layer signaling, the method further includes: feeding back HARQ-ACK after receiving the PDSCH bearing the MAC layer signaling, and monitoring the PDCCH based on the first configuration information at the Nth time slot after feedback of the HARQ-ACK, wherein N is an integer greater than or equal to 1.

In the solution provided by the embodiments of the present disclosure, the terminal device monitors the PDCCH based on the first configuration information at the Nth time slot after feedback of the HARQ-ACK, therefore, both the terminal device and the base station determine the effective time of the dynamic signaling based on the HARQ-ACK, thus avoiding the inconsistency of the effective time of the dynamic signaling determined by the base station and the terminal device, and further guaranteeing the timeliness of the dynamic signaling.

Alternatively, before receiving the dynamic signaling sent by the base station, the method further includes: receiving a RRC signaling sent by the base station and used to indicate second configuration information of a search space, wherein the second configuration information includes the first configuration information, and monitoring the PDCCH based on the second configuration information received.

Alternatively, in the condition that the dynamic signaling is a group physical layer downlink control channel signaling or a user-specific physical layer downlink control channel signaling, detecting, at a preset time point or within a preset time period, whether the dynamic signaling is received; if the dynamic signaling is received, monitoring the PDCCH based on the first configuration information, otherwise, monitoring the PDCCH based on the second configuration information.

In the solution provided by the embodiment of the present disclosure, the terminal device detects, at a preset time point or within a preset time period, whether the dynamic signaling is received to determine whether to monitor the PDCCH based on the first configuration information or the second configuration information, so as to avoid inconsistency between the configuration of the search space of the terminal device determined by the base station and the configuration of the search space determined by the terminal device due to the loss of the PDCCH.

In the third aspect, the present disclosure provides an apparatus for configuring a physical downlink control channel, including: an acquisition module, configured to acquire state information of a terminal device and generate a dynamic signaling based on the state information of the terminal device, wherein the state information of the terminal device includes service state information of the terminal device or channel state information of the terminal device; and a sending module, configured to send the dynamic signaling to the terminal device, wherein the dynamic signaling is used to indicate first configuration information of a search space, and the first configuration information is used to indicate that the terminal device monitors a PDCCH.

Alternatively, the first configuration information includes at least one piece of the following indication information:
information of a configuration set of an aggregation level of the PDCCH in the search space needed to be monitored by the terminal device; information of a position of a candidate resource contained in each of aggregation levels of the PDCCH in the search space needed to be monitored by the terminal device; information of a search space set of the PDCCH needed to be monitored by the terminal device; or indication information for channel estimation based on a broadband demodulation reference signal in the condition that the terminal device demodulates the monitored PDCCH.

Alternatively, the sending module is further configured to: send an RRC signaling used to indicate second configuration information of a search space, wherein the first configuration information of the search space indicated by the dynamic signaling is a subset of the second configuration information.

Alternatively, the dynamic signaling includes a MAC layer signaling, a group downlink control channel signaling or a user-specific downlink control channel signaling.

Alternatively, the dynamic signaling includes at least one of: a MAC layer signaling, a group downlink control channel signaling or a user-specific downlink control channel signaling.

Alternatively, in the condition that the dynamic signaling is the group downlink control channel signaling or the user-specific downlink control channel signaling, sending the dynamic signaling to the terminal device includes: sending the dynamic signaling to the terminal device in a preset time window.

In the fourth aspect, the present disclosure provides an apparatus for receiving configuration information of a physical downlink control channel, including:
a receiving module, configured to receive a dynamic signaling sent by a base station and monitor a PDCCH based on first configuration information of a search space indicated by the dynamic signaling; wherein the dynamic signaling is generated based on the channel state information or service state information of the terminal device acquired by the base station.

Alternatively, the receiving module monitors the PDCCH based on the first configuration information of the search space indicated by the dynamic signaling, and the first configuration information includes at least one piece of the following indication information:
information of a configuration set of an aggregation level of the PDCCH in the search space needed to be monitored by the terminal device;
information of a position of a candidate resource contained in each of aggregation levels of the PDCCH in the search space needed to be monitored by the terminal device;
information of a search space set of the PDCCH needed to be monitored by the terminal device; or indication information for channel estimation based on a broadband demodulation reference signal in the condition that the terminal device demodulates the monitored PDCCH.

Alternatively, the receiving module is further configured to receive an RRC signaling used to indicate second configuration information of the search space, wherein the first configuration information of the search space indicated by the dynamic signaling is a subset of the second configuration information; and monitor the PDCCH based on the second configuration information received.

Alternatively, the dynamic signaling includes at least one of: a MAC layer signaling, a group downlink control channel signaling or a user-specific downlink control channel signaling.

Alternatively, the receiving module is configured to, in the condition that the dynamic signaling received is the MAC layer signaling, feedback HARQ-ACK after receiving the PDSCH bearing the MAC layer signaling, and monitor the PDCCH based on the first configuration information at an Nth time slot after feedback of the HARQ-ACK wherein N is an integer greater than or equal to 1.

Alternatively, the receiving module is configured to detect, at a preset time point or within a preset time period, whether the dynamic signaling is received in the condition that the dynamic signaling is a group physical layer downlink control channel signaling or a user-specific physical layer downlink control channel signaling; and if the dynamic signaling is received, monitor the PDCCH based on the first configuration information, otherwise, monitor the PDCCH based on the second configuration information.

In the fifth aspect, the embodiment of the present disclosure further provides a communication device, including:
a memory, configured to store instructions executed by a processor; and
a processor, configured to execute the instructions stored in the memory, and execute the method of the first aspect or the second aspect.

In the sixth aspect, the embodiment of the present disclosure further provides a computer-readable storage medium, and the computer-readable storage medium stores computer instructions, and when the instructions run on the computer, the computer is caused to execute the method of the first aspect or the second aspect.

DETAILED DESCRIPTION OF THE EMBODIMENTS

It should be understood that technical solutions of the embodiments of the present disclosure may be applied to various communication systems, such as, the 5th generation new radio (5G NR) access technology system, the long term evolution (LTE) system, the LTE frequency division duplex (FDD) system, the LTE time division duplex (TDD), the code division multiple access (CDMA) system, the wideband code division multiple access (WCDMA) system, the global system of mobile communication (GSM), the general packet radio service (GPRS), the universal mobile telecommunication system (UMTS), the worldwide interoperability for microwave access (WiMAX) communication system, etc.

It should also be understood that in the embodiment of the present disclosure, the network device may be a device for communicating with the terminal device, such as, a base station (gNode B, gNB) in the 5G NR system, an evolved base station (evolutional Node B, eNB, or e-NodeB) in the long term evolution (LTE) system, a base transceiver station (BTS) in a global system for mobile communication (GSM) or code division multiple access (CDMA), a base station (NodeB) in a wideband code division multiple access (WCDMA), or the like.

In the solutions provided by the embodiments of the present disclosure, the described embodiments are only part of the embodiments of the present disclosure, and not all of the embodiments. Based on the embodiments in this disclosure, all other embodiments obtained by those of ordinary skill in the art without creative work shall fall within the scope of protection of this disclosure.

In order to better understand the above-mentioned technical solutions, the following detailed description of the technical solutions of the present disclosure will be made by reference to the accompanying drawings and specific embodiments. It should be understood that the embodiments and specific features in the embodiments of the present disclosure are a detailed description of the technical solutions of the present disclosure, rather than a limitation of the technical solutions of the present disclosure, and the embodiments of the present disclosure and the technical features in the embodiments of the present disclosure may be combined with each other without conflict.

Embodiment 1

Figure 1:
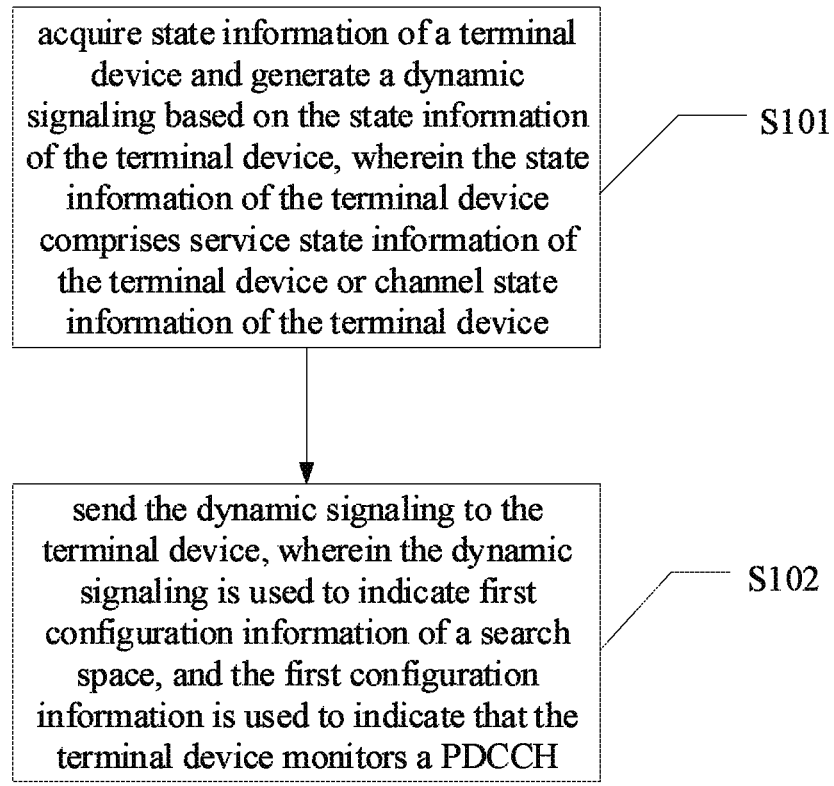
FIG. 1 is a flowchart of a method for configuring a physical downlink control channel provided by an embodiment of the present disclosure.

Please refer to the FIG. 1, the embodiment of the disclosure provides a method for configuring a physical downlink control channel, and the method includes the following processes.

Step 101, a base station acquires state information of a terminal device and generates a dynamic signaling based on the state information of the terminal device, wherein the state information of the terminal device includes service state information of the terminal device or channel state information of the terminal device.

Step 102, the base station sends the dynamic signaling to the terminal device, wherein the dynamic signaling is used to indicate first configuration information of a search space, and the first configuration information is used to indicate that the terminal device monitors a PDCCH.

In the condition that the state information of the terminal device changes, the base station generates the dynamic signaling based on the state information of the terminal device to indicate the first configuration information of the search space needed to be monitored by the terminal device in the current state.

In general, the first configuration information includes at least one or more pieces of the following indication information:

information of a configuration set of an aggregation level of the PDCCH in the search space needed to be monitored by the terminal device;

information of a position of a candidate resource contained in each of aggregation levels of the PDCCH in the search space needed to be monitored by the terminal device;

information of a search space set of the PDCCH needed to be monitored by the terminal device; or indication information for channel estimation based on a broadband demodulation reference signal in the condition that the terminal device demodulates the monitored PDCCH.

The first configuration information is necessary information for the terminal device to monitor and receive the PDCCH, and is directly related to the complexity of the search for PDCCH.

In practical application, in addition to receive the indication of the dynamic signaling, the terminal device also receives the RRC signaling, the RRC signaling is also used to indicate configuration-related information of the search space, the first configuration information indicated by the dynamic signaling is modified and adjusted according to the channel state or the service state, the second configuration information indicated by the RRC signaling is relatively comprehensive, and is not optimized for a specific scenario, the second configuration information is updated slowly, the first configuration information of the search space indicated by the dynamic signaling is a subset of the second configuration information of the search space indicated by the RRC signaling, therefore, the terminal device is indicated to monitor the PDCCH based on the first configuration information, thus reducing the number of blind detecting for the PDCCH by the terminal device, reducing the power consumption of the terminal device, and further improving the experience effect of users.

In the condition that the service state information of the terminal device is different, the base station configures different PDCCH search spaces for the terminal device, and in order to support a wide variety of services, the set of search spaces indicated by the RRC signaling is large, and the dynamic signaling will adjust the search space indicated by the RRC signaling based on the service conditions actually supported by the terminal device, i.e. the set of PDCCH search spaces indicated by the dynamic signaling is a subset of the set of search spaces indicated by the RRC signaling, and it can be seen that PDCCH monitoring by the terminal device based on the dynamic signaling can effectively reduce the number of blind detecting by the terminal device.

In addition, in the condition that the channel states of the terminal device are different, the base station configures different aggregation levels for the search space of the PDCCH. In the embodiment of the present disclosure, the base station determines the channel state of the terminal device through the signal-to-noise ratio or the reference signal receiving power (RSRP). In the condition that the signal-to-noise ratio or the RSRP of the channel of the terminal device are different, the corresponding terminal device channel state is different.

The number of search spaces and the aggregation level of the search spaces will affect the number of blind detecting by the terminal device (i.e. the situation that the terminal device monitors the PDCCH), therefore, in this embodiment, the base station device determines, based on the state information of the terminal device, the specific situation that the terminal device currently needs to carry out PDCCH monitoring, and then indicates the terminal device to carry out targeted monitoring based on the specific situation, so as to prevent the terminal device from blindly monitoring the information configured by the base station, thus reducing the number of times the blind detecting is performed.

The following is an explanation of the relationship between the state information of the terminal device and the monitoring of the PDCCH by the terminal device through several specific examples. The following is an explanation of the process of monitoring the PDCCH by the terminal device under the channel state and service state of the terminal device respectively.

Example 1, in the condition that the signal-to-noise ratio or RSRP of the terminal device channel is good, in order to reduce the resources occupied by transmission, the base station configures a low-level aggregation level AL={1, 2 or 4} for the search space of the PDCCH, and the dynamic signaling indicates the aggregation level AL={1, 2 or 4} of the search space of the PDCCH needed to be monitored by the terminal device. In the condition that the signal-to-noise ratio or RSRP of the terminal device channel is poor, the base station configures a high-level aggregation level AL={8, 16} for the search space of the PDCCH, and the final dynamic signaling indicates the aggregation level AL={8, 16} of the search space of the PDCCH needed to be monitored by the terminal device. Since the terminal device only monitors the PDCCHs in the PDCCH candidate sets corresponding to the two aggregation levels of AL=8 and AL=16 at this time, it can be seen that the number of times the blind detecting is performed by the UE can be effectively reduced since the base station indicates the terminal device to carry out PDCCH monitoring based on the state information of the terminal device.

Example 2: in the condition that the service of the terminal device is relatively rich, in order to meet the requirements of different services, the base station configures the search spaces for a plurality of PDCCHs for the terminal device, the dynamic signaling indicates that the terminal device needs to monitor the PDCCHs corresponding to the search spaces of the plurality of PDCCHs configured by the terminal device, in the condition that the services of the terminal device become less, the base station reduces the number of search spaces for the PDCCHs configured for the terminal device, and at this time, the search space of the PDCCH configured for the terminal device is a part of the search space configured for the terminal device in the condition that the service of the terminal device is relatively rich. The dynamic signaling indicates that the terminal device only monitors the PDCCH corresponding to this part of search space. It can be seen that the number of times the blind detecting is performed by the UE can be effectively reduced since the base station indicates the terminal device to carry out PDCCH monitoring based on the state information of the terminal device.

Specifically, the first configuration information includes at least one piece of the following indication information: information indicating a configuration set of an aggregation level of the PDCCH in the search space needed to be monitored by the terminal device; information indicating a position of a candidate resource contained in each of aggregation levels of the PDCCH in the search space needed to be monitored by the terminal device; information indicating a search space set of the PDCCH needed to be monitored by the terminal device; and information indicating channel estimation based on a broadband demodulation reference signal in the condition that the terminal device demodulates the monitored PDCCH.

The dynamic signaling can be used to indicate the first configuration information of the search space in various modes, including but not limited to the following modes.

Mode 1, the RRC signaling includes a level indication of the aggregation level (AL) of the search space. In the condition that the channel state of the terminal device changes, the dynamic signaling can adjust the level of the aggregation level AL of the search space indicated by the RRC signaling based on the actual requirements of the terminal device and the state of the channel.

For example, the set of an aggregation level of each search space indicated by the RRC signaling is AL={1, 2, 4, 8, 16}, the terminal device needs to monitor the PDCCHs in the PDCCH candidate sets corresponding to the five aggregation levels of AL=1, AL=2, AL=4, AL=8 and AL=16. In the condition that the channel state of the terminal device is good, the dynamic signaling is used to indicate that the set of the aggregation levels for each search space is AL={1, 2, 4}, and the terminal device only monitors the PDCCHs in the PDCCH candidate sets corresponding to the three aggregation levels of AL=1, AL=2 and AL=4. In the condition that the channel state of the terminal device is poor, the set of the aggregation levels of each search space indicated by the dynamic signaling is AL={8, 16}, and the terminal device only monitors the PDCCHs in the PDCCH candidate sets corresponding to the two aggregation levels of AL=8 and AL=16. It can be seen that the number of times the blind detecting is performed by the UE can be effectively reduced since the base station indicates the terminal device to carry out PDCCH monitoring based on the state information of the terminal device.

Mode 2, for each search space, the RRC signaling has an indication of the position of the candidate resource contained in each aggregation level. In the condition that the channel state of the terminal device changes, the position distribution of candidate resources contained in each aggregation level indicated by the RRC signaling can be adjusted accordingly in the dynamic signaling based on the actual channel state of the terminal device.

For example, the position distribution of candidate resources contained in each aggregation level of the PDCCH within each search space indicated by RRC signaling is {AL1=2, AL2=2, AL4=2, AL8=1, AL16=1}. In the condition that the channel state of the terminal device is good, in order to reduce the amount of resources used by aggregation level sending, more PDCCH candidate sets are configured to lower aggregation levels, the dynamic signaling is used to change the position distribution of candidate resources contained in each aggregation level of the PDCCH in each search space to (AL1=4, AL2=4), the distribution of PDCCH candidate sets corresponding to smaller aggregation levels AL1=4 and AL2=4 is increased. In the condition that the aggregation level is small, the resources occupied by PDCCH sending are also smaller. It can be seen that the base station can effectively reduce the resources occupied by PDCCH sending by indicating the terminal device to carry out PDCCH monitoring based on the state information of the terminal device.

Mode 3, in order to support various services, the set of search spaces indicated by the RRC signaling is relatively large. In the condition that the service state of the terminal device changes, the set of search spaces indicated by the dynamic signaling is a subset of the set of search spaces indicated by the RRC signaling.

For example, the RRC signaling indicates that the PDCCH search space set includes {search space 1, search space 2, search space 3, search space 4}, the terminal device needs to monitor the PDCCH candidate sets corresponding to the four search spaces of the search space 1, the search space 2, the search space 3 and the search space 4, in the condition that the service of the terminal device is adjusted or the power consumption requirement of the terminal device changes, the dynamic signaling indicates that the PDCCH search subset is {search space 1, search space 3}, and the terminal device only needs to monitor the PDCCH candidate sets corresponding to the two search spaces of the search space 1 and the search space 3. It can be seen that the number of times the blind detecting is performed by the UE can be effectively reduced since the terminal device is indicated to carry out PDCCH monitoring based on the service state.

Mode 4, in order to achieve better transmit diversity gain, in the condition that the RRC signaling configures resource sets, narrow-band demodulation signals are configured for PDCCH demodulation. Based on the actual situation of the terminal device, if modulation and demodulation modes need to be adjusted, dynamic instructions can be used to indicate the adoption of broadband demodulation signals for channel estimation.

For example, the RRC signaling configures a narrow-band demodulation signal for demodulation of PDCCH, In the condition that the terminal device blindly detects the PDCCH, channel estimation needs to be performed on each resource element group (REG), since each PDCCH includes a plurality of REGs, the PDCCH needs to be estimated for multiple times, while channel estimation only need to be performed on broadband-based demodulation signals once in a search space. It can be seen that channel estimation based on broadband demodulation signals indicated by the dynamic signaling can effectively reduce the number of times the channel estimation is performed and further reduce power consumption on the terminal side.

Mode 5 is a combination of at least two of the above modes 1 to 4.

In the condition that the level of the aggregation level (AL) of the search space indicated by the RRC signaling can be adjusted in the dynamic signaling based on the actual requirements of the terminal device and the state of the channel, since the base station configures the set of search spaces based on the actual channel state, the dynamic signaling is used to indicate the terminal device to monitor the PDCCH candidate set corresponding to the aggregation level (AL) of the search space, thus effectively reducing the number of times the blind detecting is performed by the terminal device.

In the condition that the position distribution of candidate resources contained in each aggregation level indicated by the RRC signaling can be adjusted accordingly in the dynamic signaling based on the actual channel state of the terminal device, PDCCH candidate sets is allocated to different aggregation levels by the dynamic indication, thus effectively adjusting the resources occupied by PDCCH sending.

In the condition that the set of search spaces indicated by the dynamic signaling is a subset of the set of search spaces indicated by the RRC signaling, the terminal device is indicated to perform PDCCH monitoring based on the service state, which can effectively reduce the number of times the blind detecting is performed by the UE.

The terminal device uses a broadband demodulation signal to estimate the channel through a dynamic instruction, does not need to estimate each REG once, and only needs to estimate the channel once in a search space, thus reducing the number of times the channel estimation is performed in a search space and further reducing the power consumption on the terminal side.

In the embodiments of the present disclosure, in order to ensure that the terminal device monitors the PDDCH, before sending the dynamic signaling, the method further includes: sending a RRC signaling used to indicate second configuration information of a search space, wherein the first configuration information of the search space indicated by the dynamic signaling is a subset of the second configuration information.

In the embodiment of the present disclosure, in order to ensure the effectiveness of the dynamic signaling, the dynamic signaling includes at least one of: a MAC layer signaling, a group downlink control channel signaling or a user-specific downlink control channel signaling. A specific implementation mode for the base station to send the dynamic signaling to the terminal device may include the following.

1. In the condition that the dynamic signaling is the MAC layer signaling, the mode specifically includes the following.

Specifically, the base station sends a PDSCH bearing the MAC layer signaling to the terminal device. After the terminal device receives the PDSCH, the terminal device sends HARQ-ACK to the base station, and the terminal device starts monitoring the PDCCH at a preset time point after sending the HARQ-ACK In the embodiments of the present disclosure, in the condition that the dynamic signaling is the MAC layer signaling, the terminal device and the base station determine the start time, at which the terminal device monitors the PDCCH based on the dynamic signaling, through the hybrid automatic repeat request-acknowledgement signal. Therefore, the effective time of the dynamic signaling determined by the terminal device and the base station is consistent, thus avoiding the difference between the effective time of the dynamic signaling in the terminal device and the effective time of the dynamic signaling in the base station.

2. In the condition that the dynamic signaling is the group downlink control channel signaling or the user-specific downlink control channel signaling, the mode specifically includes the following.

Before receiving the dynamic signaling sent by the base station, the terminal device also receives the RRC signaling sent by the base station, wherein the RRC signaling is used to indicate second configuration information of the search space, the second configuration information includes the first configuration information, and the PDCCH is monitored based on the second configuration information.

Dynamic signaling may be the group downlink control channel signaling or the user-specific downlink control channel signaling. The first configuration information includes one or more of the following information: information of a configuration set of an aggregation level of the PDCCH in the search space needed to be monitored by the terminal device; information of a position of a candidate resource contained in each of aggregation levels of the PDCCH in the search space needed to be monitored by the terminal device; information of a search space set of the PDCCH needed to be monitored by the terminal device, and indication information for channel estimation based on a broadband demodulation reference signal in the condition that the terminal device demodulates the monitored PDCCH.

The first configuration information indicated by different dynamic signalings is different, for example, the first configuration information indicated by the group downlink control channel signaling may include: information of a configuration set of an aggregation level of the PDCCH in the search space needed to be monitored by the terminal device; and information of a position of a candidate resource contained in each of aggregation levels of the PDCCH in the search space needed to be monitored by the terminal device; the first configuration information indicated by the user-specific downlink control channel signaling may include: information of a search space set of the PDCCH needed to be monitored by the terminal device; and indication information for channel estimation based on a broadband demodulation reference signal in the condition that the terminal device demodulates the monitored PDCCH. The first configuration information specifically indicated by the dynamic signaling can be configured based on the actual state information of the terminal device or actual requirements, and is not limited here.

The terminal device may receive a plurality of different dynamic signalings sent by the base station, for example, in the condition that the terminal device receives the group downlink control channel signaling and the user-specific downlink control channel signaling, the terminal device monitors the PDCCH based on the first configuration information indicated by the group downlink control channel signaling and the first configuration information indicated by the user-specific downlink control channel signaling.

The base station sends the dynamic signaling at a preset time window, the terminal device detects the dynamic signaling based on the time period or time point corresponding to the preset time window, and whether the terminal device monitors the PDCCH based on the first configuration information of the search space indicated by the dynamic signaling or the configuration of the search space indicated by the RRC signaling is determined based on whether the dynamic signaling is detected.

In the condition that the base station sends the group downlink control channel signaling or the user-specific downlink control channel signaling, the terminal device determines the configuration of the search space based on whether the dynamic signaling based on the preset time is detected, thus avoiding inconsistency between the configuration of the search space of the terminal device determined by the base station and the configuration of the search space determined by the terminal device due to PDCCH loss, and ensuring the effectiveness of the dynamic signaling.

Embodiment 2

Figure 2:
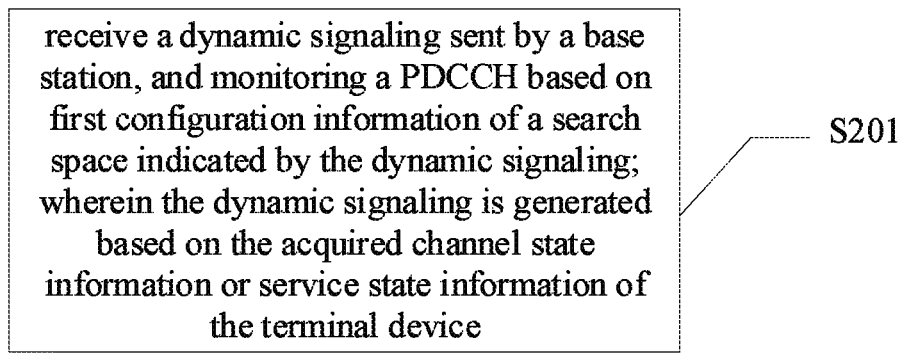
FIG. 2 is a flowchart of a method for receiving configuration information of a physical downlink control channel provided by an embodiment of the present disclosure.

Please refer to the FIG. 2, the embodiment provides a method for receiving configuration information of a physical downlink control channel, including the following step.

Step 201, the terminal device receives a dynamic signaling sent by a base station, and monitors the PDCCH based on first configuration information of a search space indicated by the dynamic signaling; wherein the dynamic signaling is generated based on the channel state information or service state information of the terminal device.

In the condition that the state information of the terminal device changes, the base station generates the dynamic signaling based on the state information of the terminal device to indicate first configuration information of the search space needed to be monitored by the terminal device in the current state, the first configuration information being a subset of the configuration information indicated by the RRC signaling. Therefore, the first configuration information is used to indicate the terminal device to monitor the PDCCH, so that the number of times the PDCCH blind detecting is performed by the terminal device is reduced, the power consumption of the terminal device is reduced, and the experience effect of users is further improved.

Alternatively, after receiving the dynamic signaling sent by the base station, the terminal device monitors the PDCCH based on the first configuration information of the search space indicated by the dynamic signaling, and the first configuration information includes at least one piece of the following indication information: information of a configuration set of an aggregation level of the PDCCH in the search space needed to be monitored by the terminal device; information of a position of a candidate resource contained in each of aggregation levels of the PDCCH in the search space needed to be monitored by the terminal device; information of a search space set of the PDCCH needed to be monitored by the terminal device; and indication information for channel estimation based on a broadband demodulation reference signal in the condition that the terminal device demodulates the monitored PDCCH.

Specifically, the process of monitoring the PDCCH by the terminal device based on the first configuration information indicated by the dynamic signaling can refer to the embodiment shown in FIG. 1 and will not be repeated here.

In the embodiment of the disclosure, in order to ensure the effectiveness of the dynamic signaling, the dynamic signaling includes at least one of: a MAC layer signaling, a group downlink control channel signaling or a user-specific downlink control channel signaling. A specific implementation mode for the base station to send the dynamic signaling to the terminal device may include the following.

1. In the condition that the dynamic signaling is the MAC layer signaling, the mode specifically includes the following.

After the terminal device receives the PDSCH bearing the MAC layer signaling, the terminal device feeds back an HARQ-ACK signal, and the terminal device starts monitoring the PDCCH at the Nth time slot after feedback of the HARQ-ACK based on the first configuration information, wherein N is an integer greater than or equal to 1. The specific implementation mode can refer to the embodiment shown in FIG. 1 and will not be repeated here.

In the solution provided by the embodiment of the present disclosure, the terminal device starts monitoring the PDCCH at the Nth time slot after feedback of the HARQ-ACK based on the first configuration information, therefore, both the terminal device and the base station determine the effective time of the dynamic signaling based on the HARQ-ACK, thus avoiding the inconsistency of the effective time of the dynamic signaling determined by the base station and the terminal device, and further guaranteeing the timeliness of the dynamic signaling.

2. In the condition that the dynamic signaling is the group downlink control channel signaling or the user-specific downlink control channel signaling, the mode specifically includes the following.

Before receiving the dynamic signaling sent by the base station, the terminal device also receives the RRC signaling sent by the base station, wherein the RRC signaling is used to indicate second configuration information of the search space, the second configuration information includes the first configuration information, and the PDCCH is monitored based on the second configuration information. The terminal device detects, at a preset time point or within a preset time period, whether the dynamic signaling is received; if the dynamic signaling is received, the terminal device monitors the PDCCH based on the first configuration information, otherwise, monitors the PDCCH based on the second configuration information.

In the solution provided by the embodiment of the present disclosure, the terminal device detects, at a preset time point or within a preset time period, whether the dynamic signaling is received to determine whether to monitor the PDCCH based on the first configuration information or the second configuration information, so as to avoid inconsistency between the configuration of the search space of the terminal device determined by the base station and the configuration of the search space determined by the terminal device due to the loss of the PDCCH.

Embodiment 3

Figure 3:
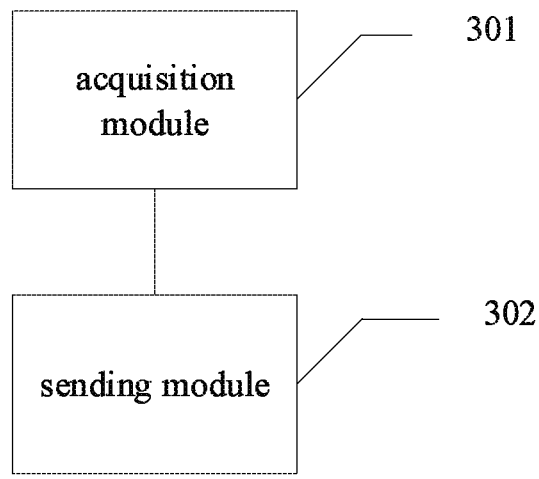
FIG. 3 is a schematic structural diagram of an apparatus for configuring a physical downlink control channel provided by an embodiment of the present disclosure.

Based on the same inventive concept, an embodiment of the present disclosure provides an apparatus for configuring a physical downlink control channel, the specific implementation mode of the method for monitoring the physical downlink control channel by the apparatus can refer to the description of the method embodiment part, and will not be repeated here, please refer to FIG. 3, the apparatus includes:
  an acquisition module 301, configured to acquire state information of a terminal device and generate a dynamic signaling based on the state information of the terminal device, wherein the state information of the terminal device includes service state information of the terminal device or channel state information of the terminal device; and
  a sending module 302, configured to send the dynamic signaling to the terminal device, wherein the dynamic signaling is used to indicate first configuration information of a search space, and the first configuration information is used to indicate that the terminal device monitors the PDCCH.

Alternatively, the first configuration information includes at least one piece of the following indication information: information indicating a configuration set of an aggregation level of the PDCCH in the search space needed to be monitored by the terminal device; information indicating a position of a candidate resource contained in each of aggregation levels of the PDCCH in the search space needed to be monitored by the terminal device; information indicating a search space set of the PDCCH needed to be monitored by the terminal device; and indication information for channel estimation based on a broadband demodulation reference signal in the condition that the terminal device demodulates the monitored PDCCH.

Alternatively, the sending module 302 is further configured to; send an RRC signaling used to indicate second configuration information of a search space, wherein the first configuration information of the search space indicated by the dynamic signaling is a subset of the second configuration information.

Alternatively, the dynamic signaling includes at least one of: a MAC layer signaling, a group downlink control channel signaling or user-specific downlink control channel signaling.

Alternatively, in the condition that the dynamic signaling is the group downlink control channel signaling or the user-specific downlink control channel signaling, sending the dynamic signaling to the terminal device includes sending the dynamic signaling to the terminal device in a preset time window.

Embodiment 4

Figure 4:
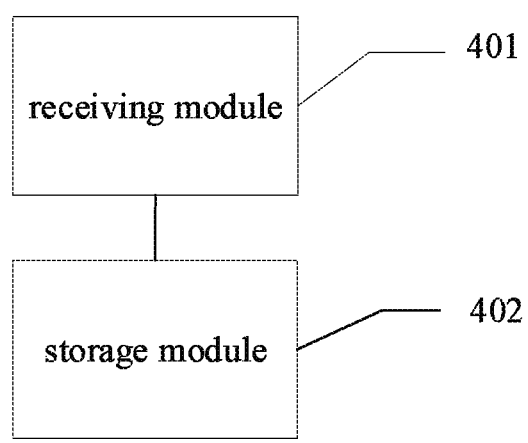
FIG. 4 is a schematic structural diagram of an apparatus for receiving configuration information of a physical downlink control channel provided by an embodiment of the present disclosure.

Based on the same inventive concept, an embodiment of the present disclosure provides an apparatus for receiving configuration information of a physical downlink control channel, the specific implementation mode of the method for monitoring the physical downlink control channel by the apparatus can refer to the description of the method embodiment part, and will not be repeated here, please refer to FIG. 4, the apparatus includes:
  a receiving module 401, configured to receive a dynamic signaling sent by a base station and monitor a PDCCH based on first configuration information of a search space indicated by the dynamic signaling; wherein the dynamic signaling is generated based on the state information of the terminal device; and
  a storage module 402, configured to store the dynamic signaling received.

Alternatively, the receiving module 401 monitors the PDCCH based on the first configuration information of the search space indicated by the dynamic signaling, and the first configuration information includes at least one piece of the following indication information: information indicating a configuration set of an aggregation level of the PDCCH in the search space needed to be monitored by the terminal device; information indicating a position of a candidate resource contained in each of aggregation levels of the PDCCH in the search space needed to be monitored by the terminal device, information indicating a search space set of the PDCCH needed to be monitored by the terminal device; and indication information for channel estimation based on a broadband demodulation reference signal in the condition that the terminal device demodulates the monitored PDCCH.

Alternatively, the dynamic signaling includes at least one of: a MAC layer signaling, a group downlink control channel signaling or a user-specific downlink control channel signaling.

Alternatively, the receiving module 401 is configured to, in the condition that the received dynamic signaling is the MAC layer signaling, feedback HARQ-ACK after receiving the PDSCH bearing the MAC layer signaling, and monitor the PDCCH based on the first configuration information at the Nth time slot after feedback of the HARQ-ACK, wherein N is an integer greater than or equal to 1.

Alternatively, the receiving module 401 is further configured to receive an RRC signaling sent by a base station and used to indicate second configuration information of the search space, wherein the second configuration information includes the first configuration information; and monitor the physical downlink shared channel (PDCCH) based on the second configuration information received.

Alternatively, the receiving module 401 is configured to detect, at a preset time point or within a preset time period, whether the dynamic signaling is received in the condition that the dynamic signaling is a group physical layer downlink control channel signaling or a user-specific physical layer downlink control channel signaling; and if the dynamic signaling is received, monitor the PDCCH based on the first configuration information, otherwise, monitor the PDCCH based on the second configuration information.

Embodiment 5

Figure 5:
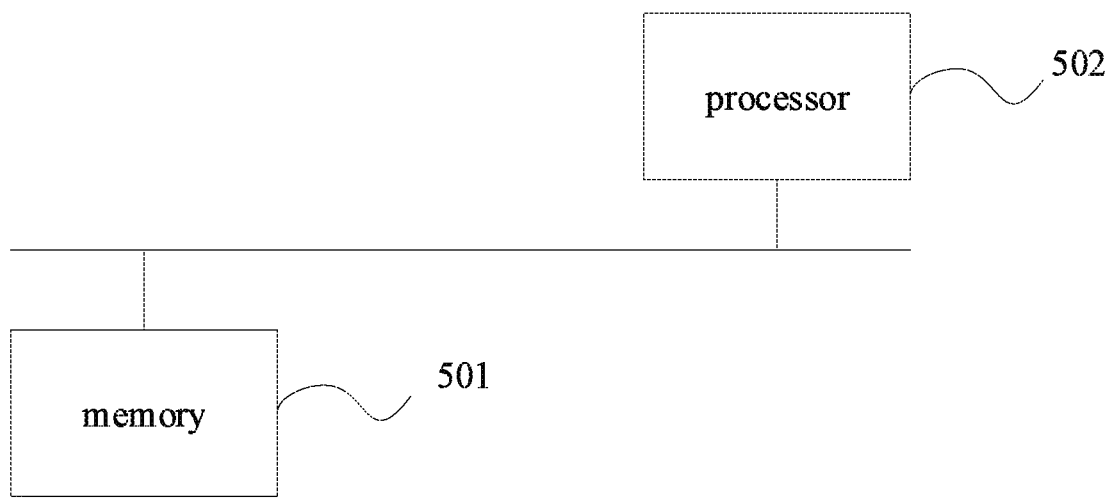
FIG. 5 is a schematic structural diagram of a communication device provided by an embodiment of the present disclosure.

Based on the same inventive concept, an embodiment of the present disclosure further provides a communication device, please refer to FIG. 5, the communication device includes:
  a memory 501, configured to store computer instructions; and a processor 502, configured to be connected with the memory and execute the computer instructions in the memory, and execute the method of the above mentioned embodiment 1 or 2.

Embodiment 6

Based on the same inventive concept, an embodiment of the present disclosure further provides a computer-readable storage medium, wherein the computer-readable storage medium stores computer instructions, and in the condition that the computer instructions run on the computer, the computer is caused to execute the method of the above mentioned embodiment 1 or 2.

Those skilled in the art should understand that embodiments of the present disclosure may be provided as a method, system, or computer program product. Thus, the present disclosure may take the form of an entirely hardware embodiment, an entirely software embodiment, or an embodiment combining software and hardware aspects. Moreover, the present disclosure may take a form of a computer program product implemented on one or more computer-usable storage media (including, but not limited to, a magnetic disk storage, an optical storage, and the like) having computer-usable program codes embodied therein.

The present disclosure is described with reference to flow charts and/or block diagrams of methods, equipment (systems), and computer program products according to embodiments of the present disclosure. It will be understood that each flow and/or block of the flow charts and/or block diagrams, and combinations of flows and/or blocks in the flow charts and/or block diagrams can be implemented by computer program instructions. These computer program instructions may be provided for a processor of a general-purpose computer, a special-purpose computer, an embedded processor or other programmable data processing equipment to generate a machine, so that instructions executed by a processor of a computer or other programmable data processing equipment produce a device for implementing functions specified in one or more flows of a flow chart and/or one or more blocks in a block diagram.

These computer program instructions may also be stored in a computer-readable memory which can guide a computer or other programmable data processing equipment to work in a particular manner, so that the instructions stored in the computer-readable memory produce a manufactured product including an instruction device, the instruction device implements functions specified in one or more flows of a flow chart and/or one or more blocks in a block diagram.

These computer program instructions may also be loaded onto a computer or other programmable data processing equipment, so that a series of operational steps are carried out on the computer or other programmable equipment to produce treatment implemented by the computer, and thus, instructions which are executed on the computer or other programmable equipment provide steps for implementing the functions specified in one or more flows in a flowchart and/or one or more blocks in a block diagram.

It will be apparent to those skilled in the art that various modifications and variations can be made to the present disclosure without departing from the spirit and scope of the present disclosure. Thus, if such modifications and variations of the present disclosure fall within the scope of the claims of the present disclosure and their equivalents, the present disclosure is also intended to encompass such modifications and variations.

What is claimed is:

1. A method for configuring a physical downlink control channel, applied to a base station device, comprising:
   acquiring state information of a terminal device and generating a dynamic signaling based on the state information of the terminal device, wherein the state information of the terminal device comprises service state information of the terminal device or channel state information of the terminal device, wherein the dynamic signaling comprises at least one of: a media access control (MAC) layer signaling, a group downlink control channel signaling or a user-specific downlink control channel signaling;
   sending a radio resource control (RRC) signaling used to indicate second configuration information of a search space; and
   sending the dynamic signaling to the terminal device, wherein the dynamic signaling is used to indicate first configuration information of the search space, the first configuration information is used to indicate that the terminal device monitors a physical downlink control channel (PDCCH), and the first configuration information is a subset of the second configuration information.

2. The method according to claim 1, wherein the first configuration information comprises at least one piece of the following information:
   information of a configuration set of an aggregation level of the PDCCH in the search space needed to be monitored by the terminal device;
   information of a position of a candidate resource contained in each of aggregation levels of the PDCCH in the search space needed to be monitored by the terminal device;
   information of a search space set of the PDCCH needed to be monitored by the terminal device; or
   indication information for channel estimation based on a broadband demodulation reference signal in the condition that the terminal device demodulates the monitored PDCCH.

3. The method according to claim 1, wherein in the condition that the dynamic signaling is the group downlink control channel signaling or the user-specific downlink control channel signaling, sending the dynamic signaling to the terminal device comprises:
   sending the dynamic signaling to the terminal device in a preset time window.

4. A method for receiving configuration information of a physical downlink control channel, applied to a terminal device, comprising:
   receiving a radio resource control (RRC) signaling used to indicate second configuration information of a search space; and
   receiving a dynamic signaling sent by a base station, wherein the dynamic signaling is generated based on acquired channel state information or service state information of the terminal device, the dynamic signaling comprises at least one of: a media access control (MAC) layer signaling, a group downlink control channel signaling or a user-specific downlink control channel signaling, first configuration information of the search space is indicated by the dynamic signaling, and the first configuration information is a subset of the second configuration information; and
   monitoring a physical downlink control channel (PDCCH) based on the first configuration information of the search space indicated by the dynamic signaling.

5. The method according to claim 4, wherein the first configuration information comprises at least one piece of the following information:
- information of a configuration set of an aggregation level of the PDCCH in the search space needed to be monitored by the terminal device;
- information of a position of a candidate resource contained in each of aggregation levels of the PDCCH in the search space needed to be monitored by the terminal device;
- information of a search space set of the PDCCH needed to be monitored by the terminal device; or
- indication information for channel estimation based on a broadband demodulation reference signal in the condition that the terminal device demodulates the monitored PDCCH.

6. The method according to claim 4, wherein:
in the condition that the dynamic signaling received is the MAC layer signaling, the method further comprising:
- feeding back hybrid automatic repeat request-acknowledgement (HARQ-ACK) after receiving a physical downlink shared channel (PDSCH) bearing the MAC layer signaling; and
- monitoring the PDCCH based on the first configuration information at an Nth time slot after feedback of the HARQ-ACK, wherein N is an integer greater than or equal to 1; or in the condition that the dynamic signaling is the group downlink control channel signaling or the user-specific downlink control channel signaling, the method further comprising:
- detecting, at a preset time point or within a preset time period, whether the dynamic signaling is received;
- if the dynamic signaling is received, monitoring the PDCCH based on the first configuration information, otherwise, monitoring the PDCCH based on the second configuration information.

7. A communication device, comprising:
a memory; and
a processor, configured to execute instructions stored in the memory to perform the method of claim 4.

8. The communication device according to claim 7, wherein the first configuration information comprises at least one piece of the following information:
- information of a configuration set of an aggregation level of the PDCCH in the search space needed to be monitored by the terminal device;
- information of a position of a candidate resource contained in each of aggregation levels of the PDCCH in the search space needed to be monitored by the terminal device;
- information of a search space set of the PDCCH needed to be monitored by the terminal device; or
- indication information for channel estimation based on a broadband demodulation reference signal in the condition that the terminal device demodulates the monitored PDCCH.

9. The communication device according to claim 7, wherein:
the processor is further configured to, in the condition that the dynamic signaling received is the MAC layer signaling, feedback hybrid automatic repeat request-acknowledgement (HARQ-ACK) after receiving the physical downlink shared channel (PDSCH) bearing the MAC layer signaling, and monitor the PDCCH based on the first configuration information at an Nth time slot after feedback of the HARQ-ACK, wherein N is an integer greater than or equal to 1; or the processor is further configured to:
- detect, at a preset time point or within a preset time period, whether the dynamic signaling is received in the condition that the dynamic signaling is the group downlink control channel signaling or the user-specific downlink control channel signaling; and
- if the dynamic signaling is received, monitor the PDCCH based on the first configuration information, otherwise, monitor the PDCCH based on the second configuration information.

10. A communication device, comprising:
a memory; and
a processor, configured to execute instructions stored in the memory to:
- acquire state information of a terminal device and generate a dynamic signaling based on the state information of the terminal device, wherein the state information of the terminal device comprises service state information of the terminal device or channel state information of the terminal device, wherein the dynamic signaling comprises at least one of: a media access control (MAC) layer signaling, a group downlink control channel signaling or a user-specific downlink control channel signaling;
- send a radio resource control (RRC) signaling used to indicate second configuration information of a search space; and
- send the dynamic signaling to the terminal device, wherein the dynamic signaling is used to indicate first configuration information of the search space, and the first configuration information is used to indicate that the terminal device monitors a physical downlink control channel (PDCCH), and the first configuration information is a subset of the second configuration information.

11. The communication device according to claim 10, wherein the first configuration information comprises at least one piece of the following information:
- information of a configuration set of an aggregation level of the PDCCH in the search space needed to be monitored by the terminal device;
- information of a position of a candidate resource contained in each of aggregation levels of the PDCCH in the search space needed to be monitored by the terminal device;
- information of a search space set of the PDCCH needed to be monitored by the terminal device; or
- indication information for channel estimation based on a broadband demodulation reference signal in the condition that the terminal device demodulates the monitored PDCCH.

* * * * *